United States Patent Office 3,522,323
Patented July 28, 1970

---

3,522,323
TWO-STAGE OXYDEHYDROGENATION PROCESS
Roy B. Duke, Jr., Littleton, Colo., George M. Bailey, Houston, Tex., and Michael J. Reuter, Denver, Colo., assignors to Marathon Oil Company, Findlay, Ohio, a corporation of Ohio
No Drawing. Continuation-in-part of application Ser. No. 722,170, Apr. 18, 1968. This application Aug. 20, 1969, Ser. No. 851,737
Int. Cl. C07c 5/18, 15/10
U.S. Cl. 260—668         35 Claims

ABSTRACT OF THE DISCLOSURE

Our invention describes a two-stage process for oxydehydrogenating hydrocarbons of the following structure:

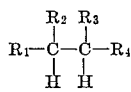

where $R_1$, $R_2$, $R_3$, and $R_4$ may be hydrogen, alkyl, alicyclic, aromatic or alkenyl or mixtures thereof, said process being conducted in the vapor phase by forming a reaction mixture of the hydrocarbon, a halogen, or halogen-containing compound, and oxygen, or an oxygen-containing gas, thereafter passing said reaction mixture through a reactor containing two zones, the first consisting either of substantially free-space or containing a substance substantially inert to its reaction with the halogen, and the second containing a catalyst consisting of metallic salts, hydroxides, or oxides, or mixture thereof, of the elements of Groups Ia, IIa, Ib, VIb, VIII, and Lanthanide Series of the Periodic Table of the Elements, said reaction mixture being passed first through the substantially free-space or inert substance, and secondary, through the catalyst zone, at temperatures between 300° and 1300° F. and at gaseous hourly space velocities between 5 and 1500 hr.$^{-1}$.

Our invention further comprises the use of: hydrocarbons having from 2 to about 20 carbon atoms; chlorine, bromine or iodine as the halogen; a molar ratio of oxygen to hydrocarbons of about 0.1 to about 3.0; a molar ratio of halogen to hydrocarbon of about 0.001 to about 0.1; inert materials such as clays, ceramic compositions, glass, Carborundum,[1] Mullite,[2] Vermiculite,[3] Alundum,[2] granular rocks, and the like; chromite containing catalysts.

---
[1] Trademark of Carborundum Company, P.O. Box 477, Niagara Falls, N.Y. 14302, used on abrasives and refractories of silicon carbides, etc.
[2] Trademarks of Norton Company, 1 New Bond St., Worcester, Mass. 01606, Alundum, trademark for a line of fused-alumina refractory and abrasive products. Mullite, an aluminum silicate formed by heating other aluminum silicates (such as cyanate, sillimanite, and andalusite) to high temperatures, and the only stable member of the group.
[3] Trademark of Zonolite Div. of W. R. Grace & Co., Dept. TR-68,135 S. La Salle, Chicago, Ill., a general term for hydrous silicate, the granules of which expand greatly at high temperatures. Webster's Unabridged Inv. Dictionary, 1968.

---

This application is a continuation-in-part of our co-pending U.S. patent application Ser. No. 722,170, filed Apr. 18, 1968, and now abandoned.

CROSS REFERENCES TO RELATED APPLICATIONS

U.S. patent application Ser. No. 828,351, filed May 27, 1969, also relates to dehydrogenation.

BACKGROUND OF THE INVENTION

Field of the invention

The field of our invention is encompassed in U.S. Patent Classification 260, Chemistry, Carbon Compounds, Carboxylic or Acyclic Halogenated Hydrocarbons, Subclass 680.

Description of the prior art

U.S. Pats. 3,308,189 and 3,308,194 to Bajars are representative of the state of the art. Bajars discloses the oxidative dehydrogenation of organic compounds in the vapor phase at "elevated temperatures" and in the presence of "an imposed inorganic contact mass." The catalytic mass comprises one elements from Group Ia and/or IIa of the Periodic Table together with a second element from Group Ib of the Periodic Table. The first component of the catalytic mass includes compounds selected from the group consisting of alkali metal oxides, and alkaline earth metal hydroxides, which may be selected from a group consisting of lithium, sodium, magnesium, potassium, calcium, strontium, barium and mixtures thereof. The second component of the catalytic mass, an inorganic metallic compound from Group Ib of the Periodic Table is preferably a copper compound: namely, a copper oxide or copper halide.

SUMMARY

General statement of the invention

The process claimed herein constitutes a significant improvement over the prior art because now the oxydehydrogenation reaction can be effected in higher conversions and yields by proceeding in a stepwise manner, i.e. by first reacting the organic-halogen-oxygen mixture over substances substantially inert to reaction with the halogen, such as glass, ceramics, Carborundum, Mullite, Vermiculite, Alundum, granular rocks, and the like, at about 300° to about 1300° F., but preferably between about 600° and about 1200° F., and then allowing the reaction mixture to pass over a catalyst consisting of metallic oxides, hydroxides, salts, and/or mixtures thereof of of Groups Ia, IIa, Ib, VIb, VIII, and the Lanthanide Series of the Periodic Table of Elements, at temperatures between about 300° and about 1300° F., but preferably between about 600° and about 1200° F. The advantages of our invention will be evident to those skilled in the art by an examination of Examples I–XV.

Example I demonstrates the results of oxydehydrogenating ethylbenzene to styrene in a reactor entirely filled with copper chromite catalyst. As the results show, the yields are low: 16:1%, 14.5%, and 15.2% respectively.

EXAMPLE I

A 304 stainless steel tubular reactor (13 inches long and 1 inch in diameter) is entirely filled with Girdler's G-22, copper chromite catalyst. The reactor is placed in a vertical, shell-type heater where the temperature of the upper- and lower-sections can be independently controlled. Both sections of the reactor are heated to 750° F. Ethylbenzene (EtPh), containing four percent iodine, and oxygen are fed to a mixing T and then allowed to pass downflow through the reactor. The ethylbenzene-iodine mixture is fed into the reactor by means of a calibrated metering pump and the oxygen is metered through a calibrated rotometer. The results are shown in Table 1.

TABLE 1.—ONE-STAGE, IODINE-PROMOTED OXYDEHYDROGENATION OF ETHYLBENZENE TO STYRENE WITH COPPER CHROMITE CATALYST

| GHSV, hr.$^{-1}$ | $O_2$/EtPh | Yield to Styrene, percent |
|---|---|---|
| 129 | 3.08 | 16.1 |
| 102 | 2.23 | 14.5 |
| 83 | 1.64 | 15.2 |

Conditions: Temperature 750° F.; Iodine 4 percent based on ethylbenzene; oxygen is the oxidizing agent.

Example II illustrates the improvement in yields and selectivities effected by using our two-stage oxydehydrogenation process, i.e., allowing the ethyl-benzene-iodine-oxygen mixture to first pass over ceramic beads, a substantially inert substance, and then over a metallic oxide catalyst, in this case copper chromite. The yields to styrene increase between three- and four-fold even though in three of the runs the iodine concentration is cut in half and only half the original amount of catalyst is employed. Yields always increase with an increasing concentration of the promoter, i.e., iodine in this example.

EXAMPLE II

The copper chromite catalyst is removed from the upper-half of the reactor described in Example I and replaced with ceramic beads. The oxydehydrogenation of ethylbenzene to styrene is then carried out under conditions similar to those employed in Example I. The results are shown in Table 2.

TABLE 2.—TWO-STAGE, IODINE-PROMOTED OXYDEHYDROGENATION OF ETHYLBENZENE TO STYRENE USING CERAMIC BEAD-COPPER CHROMITE SYSTEM

| GHSV, hr.$^{-1}$ | Iodine, percent | O$_2$/EtPh | Yield, percent | Selectivity [1] |
|---|---|---|---|---|
| 195 | 2.0 | 1.13 | 46.6 | 0.793 |
| 195 | 2.0 | 1.13 | 41.3 | 0.863 |
| 150 | 2.0 | 0.82 | 61.0 | 0.825 |
| 150 | 3.0 | 0.82 | 70.2 | 0.745 |
| 150 | 4.0 | 0.82 | 86.3 | 0.900 |

[1] Selectivity is defined as the percentage of yield divided by the percentage of conversion.
Conditions: Temperature, 750° F.; oxygen is the oxidizing agent; iodine concentration is based on ethylbenzene.

Example III demonstrates the catalytic effect of ceramic beads on the oxydehydrogenation of ethylbenzene to styrene in the absence of a copper chromite catalyst. As the results show, the yields are less than four percent indicating that ceramic beads are not good catalysts for the reaction.

EXAMPLE III

The copper chromite catalyst is removed from the reactor described in Example I and the reactor is filled entirely with ceramic beads. The oxydehydrogenation of ethylbenzene to styrene is then repeated under conditions similar to those employed in Examples I and II. The results are shown in Table 3.

TABLE 3.—ONE-STAGE, IODINE-PROMOTED OXYDEHYDROGENATION OF ETHYLBENZENE TO STYRENE USING CERAMIC BEADS AS CATALYST

| GHSV, hr.$^{-1}$ | O$_2$/EtPh | Yield, percent |
|---|---|---|
| 195 | 1.10 | <4 |

Conditions: Temperature 750° F.; iodine, four percent based on ethylbenzene; oxygen is the oxidizing agent.

We have now demonstrated that neither ceramic beads nor metallic oxides are, in themselves, good catalysts for the reaction; however, the combination of these two steps in a particular sequence leads to unexpected improvement in yields and selectivities. This is the basis of our invention.

Example IV establishes the preferred order in which the oxygen-ethylbenzene-iodine mixture is contracted with the two stages of our oxydehydrogenation process, the preferred order being to contact the mixture first with the substantially inert material, and then with the metallic oxide catalyst. Reversing this order, or creating a homogeneous mixture of ceramic beads and copper chromite catalyst results in lower yields.

EXAMPLE IV

The upper-half of the reactor described in Example I is filled with ceramic beads and the lower-half with a copper chromite catalyst. An ethylbenzene-iodine-oxygen mixture is passed downflow through the reactor (Experiment 1, Table 4). The order of the reactor packing is then reversed (Experiment 2, Table 4) and the experiment rerun. Finally, the reactor is filled with a mixture of equal volumes of ceramic beads and copper chromite catalyst and the reaction run again under identical conditions (Experiment 3, Table 4).

TABLE 4.—TWO-STAGE, IODINE-PROMOTED OXYDEHYDROGENATION OF ETHYLBENZENE TO STYRENE WITH COPPER CHROMITE CATALYSTS

| Experiment No. | Order of Reaction | Yield Styrene, Percent | Selectivity Styrene |
|---|---|---|---|
| 1 | Ceramic Beads →Copper Chromite | 46.6 | 0.793 |
| 2 | Copper Chromite→ Ceramic Beads | 21.4 | 0.658 |
| 3 | Mixture of Copper Chromite and Ceramic Beads. | 12.9 | 0.581 |

Conditions: Temperature 750° F,. iodine, two percent based on ethylbenzene; GHSV 195 hr.$^{-1}$; O$_2$/EtPh, 1.1; oxygen is the oxidizing agent.

Example V demonstrates that other compositions such as glass and Carborundum may be substituted for ceramic beads without sacrificing the improved yields obtainable with our two-stage process.

EXAMPLE V

The upper-half of the reactor described in Example I is filled in three successive experiments with first ceramic beads, then glass beads and finally Carborundum Chips. The lower-half is filled with a copper chromite catalyst. In each of the three experiments, an ethylbenzene-iodine-oxygen mixture is passed downflow through the reactor. The results are shown in Table 5.

TABLE 5.—TWO-STAGE, IODINE-PROMOTED OXYDEHYDROGENATION OF ETHYLBENZENE TO STYRENE WITH VARIOUS INERT MATERIALS AND COPPER CHROMITE CATALYST

| Inert Material | GHSV, hr.$^{-1}$ | O$_2$/EtPh | Yield Styrene percent |
|---|---|---|---|
| Ceramic Beads | 195 | 1.10 | 46.2 |
| Glass Beads | 195 | 1.10 | 30.8 |
| Carborundum Chips | 195 | 1.10 | 43.5 |

Conditions: Temperature, 750° F; iodine, 2.0 percent based on ethylbenzene; oxygen is the oxidizing agent.

Example VI shows that certain alloys can be used in place of substantially inert substances, such as ceramic, Carborundum, or glass chips, or granular rocks, without sacrificing the improved yields obtainable by our two-stage oxydehydrogenation process. Example VI also demonstrates one of the advantageous features of the process, namely, that of operating the separate steps at different temperatures.

EXAMPLE VI

The upper-half of a tubular Vycor [4] reactor (26 inches long and 1 inch in diameter) is packed with turnings of an alloy containing 22.3 percent iron, 19.5 percent chromium, and 58.1 percent nickel. The lower-half of the reactor is filled with Harshaw's Cu–1106 copper chromite catalyst. Ethylbenzene, containing two percent iodine, and oxygen, are fed to a mixing T and the resulting mixture is passed downflow through the reactor. The temperature of the inert section of the reactor is controlled at 1100° F. and the temperature of the catalyst section is controlled at 750° F. The reaction gives a conversion of ethylbenzene of 69.1 percent, a yield of 61.9 percent, and a selectivity to styrene of 0.840.

Example VII establishes that air can be used in the place of oxygen in the two-stage, iodine-promoted oxydehydrogenation of ethylbenzene to styrene and that this substitution actually leads to improved yields and selectivities.

EXAMPLE VII

The lower-half of the 304 stainless steel tubular reactor (26 inches long and 1 inch in diameter) is filled with copper chromite catalyst. The upper-half of the reactor is filled with ceramic beads. The reactor is placed in a vertical, shell-type heater, where the temperature of the

[4] Trademark of Corning Glass Co., 80 Houghton Park, Corning, N.Y. 14830. for heat and chemical resistant glassware of various compositions and physical properties.

upper- and lower-sections can be independently controlled. The upper-section of the reactor is heated to 900° F. and the catalyst section to 650° F. Ethylbenzene, containing two percent iodine, and air is fed to a mixing T and then allowed to pass downflow through the reactor. The ethylbenzene iodine mixture is fed by means of a calibrated metering pump and the oxygen through a calibrated rotameter. The results are shown in Table 6.

TABLE 6.—TWO-STAGE, IODINE-PROMOTED OXYDEHYDROGENATION OF ETHYLBENZENE TO STYRENE WITH COPPER CHROMITE CATALYST

| GHSV, hr.⁻¹ | Conversion, percent | Yield Styrene, percent | Selectivity Styrene |
|---|---|---|---|
| 151 | 92.3 | 85.1 | 0.922 |
| 249 | 87.9 | 79.7 | 0.906 |
| 147 | 85.5 | 77.8 | 0.909 |

Conditions: Temperature, ceramic beads section, 900° F.; catalyst section, 650° F.; O$_2$/EtPh, 0.90± 0.02; iodine, two percent based on ethylbenzene; air is oxidizing agent.

Example VIII demonstrates that interhalogens can be used in place of the halogens to promote the oxydehydrogenation of the hydrocarbons claimed in our invention. Specifically, Example VIII demonstrates the iodine monobromide-promoted oxydehydrogenation of ethylbenzene to styrene; however, other interhalogens, such as iodine monochloride, and bromine monochloride, can also be employed.

EXAMPLE VIII

Both sections of the reactor described in Example VII are brought to a temperature of 650° F. A two percent solution of iodine monobromide in ethylbenzene and oxygen are fed to a mixing T and then passed downflow through the reactor. The results are shown in Table 7.

TABLE 7.—TWO-STAGE, IODINE MONOBROMIDE-PROMOTED OXYDEHYDROGENATION OF ETHYLBENZENE TO STYRENE OVER COPPER CHROMITE CATALYST

| Product | Yield, percent | Selectivity |
|---|---|---|
| Benzene | 0.5 | 0.008 |
| Toluene | 0.7 | 0.011 |
| Styrene | 49.9 | 0.792 |

Conditions: GHS, 226 hr.⁻¹; O$_2$/EtPh, 1.47; oxygen is the oxidizing agent.

Example IX demonstrates that hydrohalic acids can be used in place of the halogens and interhalogens. The example demonstrates the use of hydrogen bromide as the promoter; however, hydrogen iodide and hydrogen chloride may also be used to promote the oxydehydrogenation of hydrocarbons of the general structure described herein.

EXAMPLE IX

The reactor of Example VII is modified so that an aqueous solution of hydrobromic acid can be metered into the reactor independently of the ethylbenzene and oxygen. Both sections of the reactor are brought to a temperature of 850° F. and the reactants passed downflow through the reactor. The results are shown in Table 8.

TABLE 8.—TWO-STAGE, HYDROGEN BROMIDE-PROMOTED OXYDEHYDROGENATION OF ETHYLBENZENE TO STYRENE OVER COPPER CHROMITE CATALYST

| Conversion, percent | Yield Styrene, percent | Selectivity Styrene |
|---|---|---|
| 70.6 | 60.2 | 0.854 |

Conditions: GHSV, 265 hr.⁻¹; EtPh, 1.07; EtPh/HBr, 6.30; temperature, 850° F.

A specific embodiment of this invention is the use of copper chromite as the catalyst phase of our two-stage process. As Example X demonstrates, copper chromite catalysts show greater activity when compared with other catalysts similar in composition to those taught in the patent literature.

EXAMPLE X

The upper-half of the reactor described in Example I is filled with ceramic beads and the lower-half with one of the catalysts listed in Table 9. An ethylbenzene-iodine-oxygen mixture is then passed downflow through the reactor under the conditions described in Table 9.

TABLE 9.—TWO-STAGE, IODINE-PROMOTED OXYDEHYDROGENATION OF ETHYLBENZENE TO STYRENE WITH VARIOUS CATALYSTS

| Catalyst | Conversion, percent | Yield Styrene, percent | Selectivity Styrene |
|---|---|---|---|
| Copper Oxide on Activated Alumina (Girdler's T-317) | 41.5 | 26.6 | 0.640 |
|  | 44.7 | 32.9 | 0.736 |
| Chromia on Alumina (Girdler's G-41) | 33.4 | 17.1 | 0.512 |
|  | 40.2 | 26.4 | 0.655 |
| Iron Oxide (Girdler's G-48) | 35.4 | 20.0 | 0.564 |
| Chromium-Promoted Iron Oxide (Girdler's G-3) | 52.2 | 37.8 | 0.790 |
| Copper Chromite (Girdler's T-531) | 66.8 | 54.9 | 0.821 |
| Copper Chromite (Girdler's G-22) | 54.4 | 46.2 | 0.848 |

Conditions: GHSV, 180–196 hr.⁻¹. Temperature: Ceramic Chips, 850° F.; Catalyst, 650° F.; O$_2$/EtPh, 1.10–1.35; I$_2$, 2.0 percent based on ethylbenzene.

Example XI establishes that the two-stage, oxydehydrogenation process gives higher yields than the one-stage process when used with metallic oxides other than copper chromite. The catalysts employed in Example XI are similar to those taught in the patent literature. As the results show (Table 10), in each case the yields improve when the two-stage process is employed. Furthermore, the improved yields are obtained with only half as much catalyst as employed in the single-stage process. Although copper chromite is employed as catalyst in the preferred practice of our invention, it is evident from Example XI that operating in a two-stage manner improves the yields with a variety of metallic oxide catalysts.

EXAMPLE XI

The reactor described in Example VII is initially filled with the catalyst to be studied. An ethylbenzene-iodine-air mixture is then passed downflow through the reactor. The reactor effluent is sampled periodically and the amount of styrene determined. Fresh catalyst is added to the lower-half of the reactor and ceramic beads to the upper-half. The reaction is then rerun under the same conditions employed in the first experiment. The results of these studies are shown in Table 10.

TABLE 10.—IODINE-PROMOTED, OXYDEHYDROGENATION OF ETHYLBENZENE TO STYRENE—COMPARISON OF ONE-STAGE AND TWO-STAGE PROCESSES

| Reaction Sequence | Catalyst | Yield, percent |
|---|---|---|
| One-Stage | Copper Oxide | 31–34 |
| Two-Stage | do | 82–85 |
| One-Stage | Iron Oxide | 52–59 |
| Two-Stage | do | 75–83 |
| One-Stage | Potassium Carbonate | 51–54 |
| Two-Stage | do | 69–74 |

Conditions: Temperature, ceramic bead section, 1,000° F., catalyst section, 1,000° F.; GHSV, 150 hr.⁻¹; O$_2$/EtPh, 0.90; iodine, two percent based on ethylbenzene; air is the oxidizing agent. Catalysts: 40 percent active oxides on alumina.

We have found that modified copper chromite compositions containing hydroxides, oxides, or salts of the elements from Groups Ia, IIa, VIII, and the Lanthanide Series of the Periodic Table give improved yields and selectivities in our process. This is demonstrated in Example XII. Catalyst A, for example, contains only copper chromite. Catalysts B, C, D, and E contain copper chromite and elements from either Group Ia or IIa of the Periodic Table. As the results show (Table 11), addition of the elements from Groups Ia and IIa of the Periodic Table give improved yields and selectivities. Similar results are obtained when salts, hydroxides, or oxides of Group VIII and the Lanthanide Series of elements are added to the copper chromite catalysts.

EXAMPLE XII

The catalysts described in Table 11 are prepared by dry blending copper chromite with hydroxides, oxides, or salts of Groups Ia and IIa of the Periodic Table followed by further mixing with an alumina composition, said final mixture then being formed into tablets of about ⅛ inch in size for use in the fixed bed reactors. The tablets are subsequently calcined at 1200°–1800° F.

Catalysts thus prepared are placed in the lower-half of the reactor described in Example VII. The upper-half is packed with ceramic beads. An ethylbenzene-iodine-air mixture is then passed downflow through the reactor under the conditions described. The results are shown in Table 11.

TABLE 11.—TWO-STAGE, IODINE-PROMOTED OXYDEHYDROGENATION OF ETHYLBENZENE TO STYRENE

| | GHSV | Temp., °F. | O₂/EtPh | Yield Styrene, percent | Selectivity Styrene |
|---|---|---|---|---|---|
| Catalyst: | | | | | |
| A | 151 | 1,000 | 0.90 | 63.6 | 0.903 |
| B | 152 | 900 | 0 91 | 70.1 | 0.940 |
| B | 153 | 1,000 | 0.89 | 87.7 | 0.917 |
| C | 151 | 1,000 | 0.92 | 89.2 | 0.909 |
| D | 149 | 1,000 | 0.73 | 67.4 | 0.950 |
| E | 151 | 1,000 | 0.93 | 89.0 | 0.943 |

Catalyst A: 40 percent copper chromite, 60 percent binder.
Catalyst B: 33 percent copper chromite, 33 percent potassium, and 33 percent binder.
Catalyst C: 36.4 percent copper chromite, 9.1 percent potassium carbonate, 54.5 percent binder.
Catalyst D: 33 percent copper chromite, 4 percent barium oxide, 53 percent binder.
Catalyst E: 16.5 percent copper chromite, 2 percent barium oxide, 19 percent potassium carbonate, 62.5 percent binder.

The inert materials described in Example V are man-made materials and, therefore, relatively expensive. We have also found that various naturally occurring, granular rocks may be substituted for the ceramic, glass or Carborundum Chips described in previous examples. The results have shown that the two-stage oxydehydrogenation process functions equally well if not better when granular rocks are used as the substantially inert material. This improvement is demonstrated in Example XIII.

EXAMPLE XIII

The lower-half of the reactor described in Example VII is filled with copper chromite catalyst and the upper-half with granular rocks. An ethylbenzene-iodine-air mixture is then passed downflow through the reactor under the conditions described in Table 12.

TABLE 12.—TWO-STAGE IODINE-PROMOTED OXYDEHYDROGENATION OF ETHYLBENZENE TO STYRENE USING GRANULAR ROCKS—COPPER CHROMITE SYSTEM

| GHSV, hr.⁻¹ | Temp., °F. | O₂/EtPh | Yield percent | Selectivity |
|---|---|---|---|---|
| 152 | 1,000 | 0.90 | 87.6 | 0.912 |

Air is the oxidizing agent; iodine, two percent based on ethylbenzene; 30 percent copper chromite; 10 percent potassium carbonate; 60 percent alumina.

Example XIV shows the results obtained when a copper chromite catalyst containing lesser amounts of oxides, hydroxides or salts of the Lanthanide Series is used as catalyst. As the results show, the cerium-promoted copper chromite catalyst gives excellent conversions, yields and selectivities.

EXAMPLE XIV

The upper-half of a Hastelloy [5] C tubular reactor, 26 inches long and one inch in diameter, is filled with ⅛ inch Mullite spheres and the lower-half with a supported, cerium-promoted copper chromite catalyst. The reactor is placed in a furnace where the temperature of the inert and the catalyst sections are controlled at 1000° F. Ethylbenzene, containing 2% iodine, and air are fed to a mixing T and then allowed to pass down-flow through the reactor, first over the Mullite spheres and then over the cerium-promoted copper chromite catalyst at an oxygen-to-ethylbenzene ratio of 0.80 and the gaseous hourly space velocity of 145 hr.⁻¹. The conversion, yield and selectivity obtained from this reaction are 90.5%, 80.7%, and 0.892 respectively.

---
[5] Trademark of Hanes Stellite Co., Div. of Union Carbide Corp., 270 Park Ave., N.Y. 10017; for a series of nickel-base alloys, having high resistance to corrosives, such as hot hydrochloric acid, hot sulfuric acid, wet chlorine, etc. as well as excellent physical and mechanical properties.

Example XV demonstrates the improved yields and selectivities attainable with iron-promoted, copper chromite catalysts.

EXAMPLE XV

The lower-half of the reactor described in Example XIV is filled with an iron-promoted, copper chromite catalyst and the upper-half with ⅛ inch Mullite spheres. Ethylbenzene, containing two percent iodine, and air are then passed downflow through the reactor, first through the Mullite sphere section and then through the catalyst section at a gaseous hourly space velocity of 143 hr.⁻¹ and an oxygen-to-ethylbenzene ratio of 0.59. The temperature is 1000° F. The conversion yield, and selectivity are 90.4%, 83.9%, and 0.928, respectively.

UTILITY OF THE INVENTION

A notable advantage of our invention is that it reduces the downstream processing necessary in purifying the dehydrogenated product because it gives substantially higher yields. Current methods for preparing styrene from ethylbenzene, butadiene from n-butenes, and isoprene from isoamylenes, give yields of about 40 percent; the remaining 60 percent of the reactor effluent must be separated and recycled back through the dehydrogenation unit. These separations are time consuming, expensive and often difficult to achieve. The higher yields made possible by our invention minimize the amount of recycling necessary.

The end products of this invention are unsaturated compounds many of which are useful as monomers. Styrene, butadiene, and isoprene, for example, can be polymerized to form articles of known commercial value. More specifically, styrene may be polymerized for the manufacture of molded articles and foam; isoprene may be polymerized for the manufacture of various rubber articles; butadiene may be polymerized for the manufacture of synthetic rubbers, and copolymerized with styrene and acrylonitrile to form resins.

DESCRIPTION OF THE PREFERRED EMBODIMENTS

Starting materials

The hydrocarbons which may be utilized as starting materials for this invention should preferably have from 2 to about 20 carbon atoms (more preferably 2 to 12) and at least one group of the following structure:

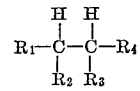

wherein $R_1$, $R_2$, $R_3$ and $R_4$ may be hydrogen, alkyl, aryl, alicyclic, or alkenyl groups, or combinations thereof. Suitable organic compounds include, for example, ethylbenzene, cumene, diethyl benzenes such as 1,2-, 1,3-, or 1,4-diethylbenzenes, ethyltoluenes, 1-phenylbutane, 2-phenylbutane, butene-1 or butene-2, 2 methylbutene-1, 2-methylbutene-2, 3-methylbutene-1, indane, alkyl-substituted indanes, pentene-1 and pentene-2 or a mixture of n-pentenes and isopentenes. The hydrocarbons, which comprise alkyl aromatic compounds, having from 2 to about 12 carbon atoms in the side chain and/or chains are preferable.

Inert materials

The inert materials which are useful in the practice of our invention include those materials which do not react with the halogen promoter under the conditions of the reaction. Substances such as glass, Carborundum, ceramics, Mullite, Alundum, Vermiculite, granular rocks, and the like fall into the category of inert materials. The reactors, however, need not necessarily be packed with one of said inert materials over which the reaction mixture is passed prior to contact with the catalyst, although this is preferable. Alternatively, the reaction mixture may be passed through tubes, pipes, and the like, made of alloys, ceramic materials, or other materials that do not react with the halogen under the conditions of the reaction.

Catalysts

Many catalysts have been evaluated in our two-stage, oxydehydrogenation process other than those described in the examples appended to this disclosure. All of these catalysts have given higher yields and selectivities in the two-stage oxydehydrogenation process as compared to single-stage operation. Of the catalysts evaluated, those consisting of metallic salts, oxides, and hydroxides, and mixtures thereof containing elements of Groups I$a$, II$a$, I$b$, VI$b$, VIII, and the Lanthanide Series of the Periodic Table of the Elements proved superior. Catalyst salts and hydroxides will generally be converted to oxides during the reactions of the invention.

The preferred catalysts for use in our invention are chromites of the general formula:

$$(M^i)_j(Cr_2O_4)_k$$

where $i$ is the valence state of metal M and $j$ and $k$ are integers such that $$j = 2k/i$$

and M is preferably an element from Groups II$a$, IV$a$, V$a$, or I$b$ through VII$b$ and VIII of the Periodic Table. Rare earth element chromites are also excellent catalysts. Mixtures of several chromites are also acceptable catalysts, as well as chromites containing lesser amounts of oxides, hydroxides, or salts of the elements of Group I$a$ of the Periodic Table.

The most preferred catalyst for use in our invention is a copper chromite composition. The copper chromite catalysts may be modified to incorporate the synergistic effects of lesser amounts of the elements of Groups I$a$, II$a$, VIII and the Lanthanide Series of the Periodic Table of the Elements in the form of salts, hydroxides, or oxides. Such catalysts may be obtained commercially or may be prepared by one skilled in the art. Commercially available catalysts such as Girdler's G-22 and T-531, or Harshaw's Cu-1800 and Cu-1106 are suitable. Alternatively, the copper chromite catalysts may be prepared by thermally decomposing copper chromate, or by other methods employed by those skilled in the art. A review of the various routes to chromites may be found in the following references: Chromium, M. J. Udy, Reinhold Publishing Co., New York, 1956 and Reactions of Organic Compounds Over Copper-Chromium Oxide and Nickel Catalysts, Homer Adkins, University of Wisconsin Press, 1937. The chromite catalysts may be tableted for use in fixed bed reactors or may be pulverized and sized for use in fluidized bed reactors. The tableted catalysts may contain binders such as sodium silicate, sodium aluminate, magnesium silicate, and the like, or may be supported on carriers such as kieselguhr, alumina, silica, magnesia, zirconia, thoria, pumice, and the like. The surface areas of the catalysts range between 0.1 and 300 square meters per gram.

Reactors

The reactors used in the practice of this invention are preferably constructed or lined with or otherwise contain titanium, tantalum, nickel, or alloys containing one or more of these metals. Particularly preferred are alloys containing at least 40 percent nickel, 0 to 30 percent of the metals iron, chromium, and molybdenum, and 0 to 10 percent of the metals vanadium, cobalt, tantalum, and niobium, and 0–10 percent of the element silicon. Examples of such useful alloys of nickel include the stainless steels, the Hastelloys [6], the Inconels [7] and the Incoloys [7]. The reactor shape is not of importance, although tubes are most convenient. The upper-portion of the reactor is packed with the inert substances such as ceramic, Mullite, Carborundum, glass, Vermiculite, Alundum, naturally occurring granular rocks and the like over which the reaction mixture is passed prior to entering the catalyst section of the reactor, thus providing a two-stage reactor. Alternatively, the reactants may be preheated in tubes, pipes, etc. made of the above-mentioned alloys or other materials which are substantially inert, such as clays, Mullite, Alundum, or other ceramic compositions. The ratio of the volume of inert to the volume of catalyst zones can be varied to suit the particular feed and conditions employed. In general, the inert zone volume will be preferably 0.2 to 20, more preferably 0.4 to 5, and most preferably 0.6 to 2 times the volume of the catalyst zone.

Oxidizing agent

Oxygen, the preferred oxidizing agent, may be introduced to the reactor as pure oxygen, or as oxygen diluted with other gases such as helium, nitrogen, carbon monoxide, carbon dioxide, or as air. The molar ratio of oxygen to hydrocarbon should be from 0.01 to 3.0 or greater and most preferably between 0.10 to about 1.2. It is also preferable to form a reaction mixture of the oxygen or oxygen-containing gas, the hydrocarbon, and the halogen or halogen-containing compound prior to introducing the reactants into the reactor.

Temperature

The reaction is effected by passing the reaction mixture first through the section of the reactor containing the inert substance or void space at temperatures ranging from 300° to 1300° F., but preferably between 600° and 1200° F., and then through the section of the reactor containing the catalyst at temperatures ranging from 300° to 1300° F., but preferably between 600° and 1200° F. Most preferably, the two sections of the reactor are operated between 850° and 1150° F. It is not necessary to operate both sections at the same temperature and in certain instances, improved yields are obtained when operating the two sections of the reactor at different temperatures.

Pressures

The reaction may be effected at pressures ranging from 0.01 to 100 atmospheres, but preferably, between 0.1 and 5 atmospheres, and most preferably at about 0.8 to about 1.2 atmospheres.

Flow rates

The flow rates of the reactants may be varied widely but, preferably, the flow rates of the hydrocarbons should range from about 0.01 to about 10 liquid volumes per volume of reactor per hour and most preferably, between about 0.10 to 1.0 liquid volume of organic compound per volume of reactor per hour. Space velocities may also be calculated in terms of gaseous hourly space velocity, abbreviated GHSV, which is defined as the volumes of reactant vapor, calculated under standard conditions (STP), passed per hour per unit volume of the reaction zone. Inert gases, such as nitrogen and helium are considered as part of the reactant vapor. Gaseous hourly space velocities between about 5 and 1500 hr.$^{-1}$ may be employed for the oxidative dehydrogenation reaction but, preferably, between 10 and 1000 hr.$^{-1}$, and most preferably between 100 to 600 hr.$^{-1}$ are used.

What is claimed is:

1. A two-stage process for oxydehydrogenating hydrocarbons of the following structure:

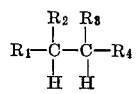

---
[6] See footnote 5, col. 7.
[7] Trademarks of International Nickel Co., 71 Wall St., New York, N.Y. 10005; Inconel—an alloy containing approximately 76% nickel, 16% chromium, and 6% iron; Incoloy—an alloy containing approximately 32% nickel, 21% chromium and 46% iron.

where $R_1$, $R_2$, $R_3$, and $R_4$ may be hydrogen, alkyl, alicyclic, aromatic, or alkenyl or mixtures thereof, said process being conducted in the vapor phase by forming a reaction mixture of the hydrocarbon, a halogen, or halogen-containing compound, and oxygen, or an oxygen-containing gas, thereafter passing said reaction mixture through a reactor containing two zones, the first consisting of substantially free-space or containing a substance substantially inert to its reaction with the halogen or halogen-containing compound, and the second containing a catalyst consisting of metallic salts, hydroxides, or oxides, or mixtures thereof, containing the elements of Groups Ia, IIa, Ib, VIb, VIII, and the Lanthanide Series of the Periodic Table of the Elements, said reaction mixture being passed first through the substantially free-space or inert substance, and secondly, through the catalyst zone, at temperatures between 300° and 1300° F. and at gaseous hourly space velocities between 5 and 1500 hr.$^{-1}$.

2. The process of claim 1 wherein the catalyst comprises copper chromite.

3. The process of claim 1 wherein the catalyst comprises copper chromite and salts, hydroxides, or oxides of the elements of Groups Ia, IIa, VIII, and the Lanthanide Series of the Periodic Table of the Elements.

4. The process of claim 3 wherein the catalyst is comprised of copper chromite and a salt, oxide, or hydroxide of barium.

5. The process of claim 3 wherein the catalyst is comprised of copper chromite and oxides, hydroxides or salts of iron.

6. The process of claim 3 wherein the catalyst is comprised of copper chromite and oxides, hydroxides or salts of nickel.

7. The process of claim 3 wherein the catalyst is comprised of copper chromite and oxides, hydroxides, or salts of potassium.

8. The process of claim 3 wherein the catalyst is comprised of copper chromite and oxides, hydroxides, or salts of cerium.

9. The process of claim 1 wherein at least one of the zones contains an elemental metal comprising titanum-tantalum, nickel, or alloys containing these elements.

10. The process of claim 9 wherein the alloy contains at least 40 percent nickel, 0 to 30 percent of the metals iron, chromium, and molybdenum, and 0 to 10 percent of the metals vanadium, cobalt, tantalum, and niobium, and 0-10 percent of the element silicon.

11. The process of claim 1 wherein said hydrocarbons have 2 to about 20 carbon atoms.

12. The process of claim 2 wherein said organic compounds comprise alkyl aromatic hydrocarbons having from 2 to about 12 carbon atoms in the side chain and/or chains.

13. The process of claim 1 wherein oxygen is in a molar ratio of about 0.1 mole to about 3.0 moles per mole of hydrocarbon.

14. The process of claim 1 wherein the halogen is in a molar ratio of about 0.001 mole to about 0.1 mole per mole of hydrocarbon.

15. The process of claim 1 wherein the reaction mixture is passed over said inert material at a temperature from about 600° to about 1200° F.

16. The process of claim 6 wherein the reaction mixture is passed over the catalyst at a temperature of about 600° to 1200° F.

17. The process of claim 1 wherein the oxydehydrogenation is carried out at a pressure in the range of from about 0.1 to about 10 atmospheres.

18. The process of claim 1 wherein the promoter comprises chlorine, bromine, or iodine.

19. The process of claim 1 wherein the promoter comprises hydrohalic acids, hydrochloric, hydrobromic and hydroiodic.

20. The process of claim 1 wherein the promoter comprises an interhalogen compound.

21. The process of claim 1 wherein the inert material of the inert stage comprises clay or ceramic compositions.

22. The process of claim 1 wherein the inert material of the inert stage is expanded hydrous silicate.

23. The process of claim 1 wherein the inert material of the inert stage is silcon carbide.

24. The process of claim 1 wherein the inert material of the inert stage is granular rock materials.

25. The process of claim 1 wherein the inert material of the inert stage is fused alumina.

26. The process of claim 1 wherein the inert material of the inert stage is alumina silicate.

27. The process of claim 1 wherein the hydrocarbon is ethylbenzene, and the product is styrene.

28. The process of claim 1 wherein the hydrocarbon is cumene, and the product is alpha-methylstyrene.

29. The process of claim 1 wherein the hydrocarbon is pentene-1, or pentene-2, or mixtures thereof, and the product is piperylene.

30. The process of claim 1 wherein the hydrocarbon is 2-methylbutene-1, 2-methylbutene-2, 3-methylbutene-1, or mixtures thereof and the product is isoprene.

31. The process of claim 1 wherein the hydrocarbon is butene-1, butene-2, or a mixture thereof, and the product is butadiene.

32. The process of claim 1 wherein the hydrocarbon is indane or alkyl substituted indanes, and the product is indene, or the corresponding alkylated indenes.

33. The process of claim 1 wherein the hydrocarbon is 1,2-, 1-3-, or 1,4-diethylbenzene, and the product is the corresponding divinylbenzene.

34. The process of claim 1 wherein the hydrocarbon is a mixture of n-pentenes and isopentenes and the product is a mixture of isoprene and piperylene.

35. The process of claim 1 wherein the hydrocarbon is 2-phenylbutane and the product is 2-phenylbutadiene.

References Cited

UNITED STATES PATENTS

| | | | |
|---|---|---|---|
| 3,274,285 | 9/1966 | Bajars | 260—680 |
| 3,308,189 | 3/1967 | Bajars | 260—680 |
| 3,308,194 | 3/1967 | Bajars | 260—680 |
| 3,308,199 | 3/1967 | Bajars | 260—680 |

DELBERT E. GANTZ, Primary Examiner

C. R. DAVIS, Assistant Examiner

U.S. Cl. X.R.

260—669, 680, 683.3

PO-1050
(5/69)

UNITED STATES PATENT OFFICE
CERTIFICATE OF CORRECTION

Patent No. 3,522,323  Dated July 28, 1970

Inventor(s) Roy B. Duke, et al

It is certified that error appears in the above-identified patent and that said Letters Patent are hereby corrected as shown below:

Claim 1, line 12:  should read as follows:  --or oxides, or mixtures thereof, of the elements--

Claim 1, line 13:  should read as follows:  --of Groups Ia, IIa, Ib, VIb, VIII, or the Lanthanide--

Claim 3, line 24:  should read as follows:  --of the elements of Groups Ia, IIa, VIII, or the Lan- --

SIGNED AND
SEALED
NOV 3 1970

(SEAL)
Attest:

Edward M. Fletcher, Jr.
Attesting Officer

WILLIAM E. SCHUYLER, JR.
Commissioner of Patents